US005635292A

United States Patent [19]
Jennings et al.

[11] Patent Number: 5,635,292
[45] Date of Patent: Jun. 3, 1997

[54] COMPRESSED LOW DENSITY HYDRAULICALLY BONDED COMPOSITE ARTICLES

[75] Inventors: Hamlin M. Jennings, Wilmette, Ill.; Simon K. Hodson, Santa Barbara, Calif.

[73] Assignee: E. Khashoggi Industries, Santa Barbara, Calif.

[21] Appl. No.: 326,013

[22] Filed: Oct. 18, 1994

Related U.S. Application Data

[60] Division of Ser. No. 50,705, Apr. 21, 1993, Pat. No. 5,356,579, which is a continuation-in-part of Ser. No. 565,602, Aug. 10, 1990, abandoned, which is a continuation-in-part of Ser. No. 526,231, May 18, 1990, abandoned.

[51] Int. Cl.$^6$ .............................. B32B 13/02; C04B 40/02
[52] U.S. Cl. ..................... 428/312.4; 428/317.9; 428/542.8; 428/703; 428/913; 106/122; 106/605; 106/606; 106/672; 106/723; 106/820
[58] Field of Search ..................... 428/312.4, 703, 428/292, 305.5, 317.9, 913, 542.8; 264/42, 71, 85, 122, 128, 237, 333, 336, 344, 348, DIG. 43; 106/605, 606, 672, 682, 723, 122, 409, 820, 711, 716, 753, 818

[56] References Cited

U.S. PATENT DOCUMENTS

| | | |
|---|---|---|
| 591,168 | 10/1897 | Heinzerling . |
| 1,427,103 | 8/1922 | Haenicke et al. . |
| 2,045,099 | 6/1936 | Pond . |
| 3,027,266 | 3/1962 | Wikne . |
| 3,468,993 | 9/1969 | Bierlich . |
| 3,499,069 | 3/1970 | Seigle . |
| 3,526,172 | 9/1970 | Stuart . |
| 3,607,753 | 9/1971 | Suchoff . |
| 3,683,760 | 8/1972 | Silva . |
| 3,770,859 | 11/1973 | Bevan . |
| 3,914,359 | 10/1975 | Bevan . |
| 3,917,781 | 11/1975 | Gabriel et al. . |
| 3,927,163 | 12/1975 | Gabriel et al. . |
| 3,950,470 | 4/1976 | Davidovits . |
| 3,983,050 | 9/1976 | Mecham . |
| 3,985,925 | 10/1976 | Lefebvre et al. . |
| 4,000,027 | 12/1976 | Dalle et al. . |
| 4,028,454 | 6/1977 | Davidovits et al. . |
| 4,036,922 | 7/1977 | Ito et al. . |
| 4,117,059 | 9/1978 | Murray . |
| 4,196,161 | 4/1980 | Toffolon et al. . |
| 4,233,368 | 11/1980 | Baehr et al. . |
| 4,234,344 | 11/1980 | Tinsley . |
| 4,239,716 | 12/1980 | Ishida et al. . |
| 4,244,904 | 1/1981 | Drain . |
| 4,328,178 | 5/1982 | Kossatz . |
| 4,349,386 | 9/1982 | Davidovits . |
| 4,383,862 | 5/1983 | Dyson . |
| 4,407,769 | 10/1983 | Harada et al. . |
| 4,415,366 | 11/1983 | Copening . |
| 4,427,610 | 1/1984 | Murray . |
| 4,472,199 | 9/1984 | Davidovits . |
| 4,509,985 | 4/1985 | Davidovits et al. . |
| 4,522,652 | 6/1985 | Neuschäffer et al. . |
| 4,522,772 | 6/1985 | Bevan . |
| 4,524,039 | 6/1985 | Bevan . |
| 4,533,393 | 8/1985 | Neuschäffer et al. . |
| 4,563,432 | 1/1986 | Ehlert et al. . |
| 4,608,795 | 9/1986 | Neuschäffer et al. . |
| 4,637,860 | 1/1987 | Harper et al. . |
| 4,640,715 | 2/1987 | Heitzmann et al. . |
| 4,642,137 | 2/1987 | Heitzmann et al. . |

(List continued on next page.)

FOREIGN PATENT DOCUMENTS

| | | |
|---|---|---|
| 3512515 A1 | 10/1986 | Germany . |
| 52-26523 | 2/1977 | Japan . |
| 323390 | 2/1972 | U.S.S.R. . |
| 592599 | 2/1978 | U.S.S.R. . |
| 960147 | 9/1982 | U.S.S.R. . |
| 181745 | 6/1922 | United Kingdom . |
| 366544 | 2/1932 | United Kingdom . |
| 431484 | 7/1935 | United Kingdom . |
| 453555 | 9/1936 | United Kingdom . |
| 1311622 | 3/1973 | United Kingdom . |
| 2086748 | 5/1982 | United Kingdom . |
| 2183200 | 6/1987 | United Kingdom . |

OTHER PUBLICATIONS

Bukowski et al., *Reactivity and Strength Development of $Co_2$ Activated Non-Hydraulic Calcium Silicates*, Cement and Concrete Research, vol. 9, pp. 57–68, (1979).

Feldman et al., *A Study of Length Changes of Compacts of Portland Cement on Exposure to $H_2O$*, Paper sponsored by Committee on Basic Research Pertaining to Portland Cement and Concrete, pp. 106–118.

Hlavac, *The Technology of Glass and Ceramics—An Introduction*, Glass Science and Technology, 4, (1983).

Jones et al., *Ceramics Industrial Processing and Testing*, The Iowa State University Press, pp. 20–61 (1972).

Lawrence, *The Properties of Cement Paste Compacted Under High Pressure*, London Cement and Concrete Association, Research Report 19, pp. 21 (Jun. 1969).

Maycock et al., *Carbonation of Hydrated Calcium Silicates*, Cement and Concrete Research, vol. 4, pp. 69–76 (1974).

Skalny et al., *Low Water to Cement Ratio Concretes*, Cement and Concrete Research, vol. 3, pp. 29–40 (1973).

Suzuki et al., *Formation and Carbonation of C–S–H In Water*, Cement and Concrete Research, vol. 15, pp. 213–224 (1985).

Report on the Panel on Solids Processing, Chapter 2, pp. 18–43.

*Primary Examiner*—Marion E. McCamish
*Assistant Examiner*—Blaine R. Copenheaver
*Attorney, Agent, or Firm*—Workman, Nydegger & Seeley

[57] ABSTRACT

Incorporation of solid removable aggregates into powdered cement which later completely dissolve, evaporate, volatilize, or melt leaving voids in the cement composition is discussed. Cementitious articles are prepared by manipulating powdered hydraulic cement or cement paste compositions into mechanically self-supporting structures of a predetermined configuration and thereafter hydrating the hydraulic cement compositions without mechanical mixing of the cement and water.

43 Claims, No Drawings

U.S. PATENT DOCUMENTS

| | | |
|---|---|---|
| 4,681,631 | 7/1987 | Engles et al. . |
| 4,772,439 | 9/1988 | Trevino-Gonzalez . |
| 4,812,273 | 3/1989 | Bevan . |
| 4,826,931 | 5/1989 | Sakai et al. . |
| 4,830,669 | 5/1989 | Suzuki . |
| 4,859,367 | 8/1989 | Davidovits . |
| 4,859,383 | 8/1989 | Dillon . |
| 4,888,311 | 12/1989 | Davidovits et al. . |
| 4,919,852 | 4/1990 | Green . |
| 4,923,652 | 5/1990 | Murakawa et al. . |
| 5,087,277 | 2/1992 | Gonzalez et al. . |

COMPRESSED LOW DENSITY HYDRAULICALLY BONDED COMPOSITE ARTICLES

RELATED APPLICATIONS

This patent application is a divisional of application Ser. No. 08/050,705, filed Apr. 21, 1993, in the names of Hamlin M. Jennings, Ph.D., and Simon K. Hodson, and entitled METHODS OF MANUFACTURE AND USE FOR LOW DENSITY HYDRAULICALLY BONDED CEMENT COMPOSITIONS issued U.S. Pat. No. 5,356,579, which is a continuation-in-part of U.S. patent application Ser. No. 07/565,602, filed Aug. 10, 1990 in the names of Hamlin M. Jennings and Simon K. Hodson and entitled "LOW DENSITY HYDRAULICALLY BONDED CEMENT COMPOSITIONS AND THEIR METHODS OF MANUFACTURE AND USE" (now abandoned), which is a continuation-in-part of patent application Ser. No. 07/526,231, filed May 18, 1990, now abandoned, in the names of Hamlin M. Jennings and Simon K. Hodson and entitled "HYDRAULICALLY BONDED CEMENT COMPOSITIONS AND THEIR METHODS OF MANUFACTURE AND USE" (now abandoned) Each of the foregoing applications is incorporated herein by specific reference.

BACKGROUND

1. The Field of the Invention

The present invention relates to novel hydraulically bonded cement compositions and methods having low density. More particularly, the present invention is directed to incorporating solid removable aggregates into powdered cement which later dissolve, evaporate, volatilize, or melt leaving voids in the cement composition.

3. Technology Review

Hydraulic cements have been used for thousands of years as the binding agent in mortars and concretes. These cement-based materials are formed by mixing hydraulic cement, which is a dry powder, with water and often, either simultaneously or subsequently, some sort of aggregate is blended into the mixture. When water is added to hydraulic cements, the existing minerals in the cement either decompose or combine with water, and a new phase, such as a calcium-silicate-hydrate structure, grows throughout the volume. Upon curing, the water-cement mixture, sometimes referred to as cement paste, binds aggregates together to form concrete and mortar. The amount of water mixed with the cement and the intensity of mixing are often carefully controlled to maximize the ultimate properties while at the same time imparting desirable rheological properties to the cement paste.

By its nature, cement has historically been mixed with water and then shaped, formed, or placed in a mold. It has long been known that higher strengths can be achieved by reducing the water to solids ratio, but this has always had the disadvantage of making the mixture more stiff and difficult to place into a mold. Thus, the practical use of cement-based materials represents a compromise between having a workable fluid mixture, which requires excess water between cement particles, and having a very strong product, which requires dense packing of the cement particles. It is a compromise between two opposing requirements: that the cement paste be fluid and that the final product be dense and strong.

Most of the advances in cement science over the last ten years have been dedicated to overcoming the compromise between rheological properties and strength and density properties of cements. Efforts have been made to prepare a cement paste that is fluid enough to be handled, but that will react and form a dense final product. A number of surfactants, lubricants, and mixing techniques have been proposed to enable the cement paste to be manipulated early on and then later form a strong material.

In many applications, it is desirable to have a low density cementitious product having reasonably high strength. Such applications include insulation, lightweight structural components, products with controlled dielectric properties, and packaging.

From the foregoing, it will be appreciated that what is needed in the art are novel compositions and methods of hydrating hydraulic cement in which the cement can be readily manipulated, shaped, and formed into a strong, low density material.

Additionally, it would be a significant advancement in the art to provide novel compositions and methods of hydrating hydraulic cement in which the cement can be readily manipulated, shaded, and formed without first mechanically mixing the cement with water to form a cement paste.

Such hydraulic cement compositions and methods are disclosed and claimed herein.

BRIEF SUMMARY AND OBJECTS OF THE INVENTION

The present invention is directed to novel low density hydraulically bonded cement compositions and methods. Low density cement articles are prepared within the scope of the present invention by compressing powdered hydraulic cement (in some cases, cement paste) with a solid removable aggregate material which will later undergo a phase change and leave voids in the final cement product.

The term "solid removable aggregate" and "removable aggregate" as used in the specification and appended claims includes those materials that are capable of being pressed with the cement into a mechanically self-supporting structure without being crushed and which can subsequently be removed from the self-supporting structure by under going a phase change such as melting, volatilizing, evaporating, or dissolving so as to leave a void corresponding substantially to the size and shape of the removable aggregate. As used herein, solid removable aggregates which sublimate are included with solid removable aggregates which volatilize. Ice, dry ice, frozen aqueous solutions, and certain salts are typical solid removable aggregates which may be used in practicing the present invention.

As used herein, the term "cement paste" includes a fluid mixture of cement and water. Generally, in a cement paste the hydration reaction has commenced, but has not completed. Typical cement pastes will have a water to cement ratio in the range from 0.1 to about 5, and a preferred water to cement ratio of about 0.2.

The removable aggregate material particle size and shape determines the size and shape of the resulting voids in the cement product. The size and quantity of voids affects the density and strength characteristics of the final cement product. Generally, the more removable aggregate particles, the lower the density and the lower the strength. Importantly, it is possible to mold the interior of a cement product by using one or more appropriately configured removable aggregates within the scope of the present invention.

In the preferred embodiment, the powdered hydraulic cement and solid removable aggregates are positioned into a predetermined configuration under a pressure sufficient to make the article mechanically self-supporting prior to hydration of the cement. Positioning the cement and removable aggregates is accomplished through pressure compaction processes, vibratory compaction processes, or a combination of pressure compaction and vibratory compaction.

After the powdered hydraulic cement or cement paste has been deliberately positioned into a predetermined configuration, the cement is hydrated. When powdered hydraulic cement is used, hydration is accomplished without mechanical mixing of the cement and water. Thus, diffusion of water both gaseous and/or liquid) into the preconfigured cement article is an important hydration technique within the scope of the present invention. In some cases the water necessary for hydration of the powdered hydraulic cement may be in the form of frozen water or aqueous phase compressed with the powdered hydraulic cement.

Hydration parameters and conditions known in the cement industry, such as temperature, water to solids ratio, cement to removable aggregate ratio, particle size distribution of the cement paste, and composition of the cement paste, are It also important considerations in hydrating the cement compositions within the scope of the present invention.

It is, therefore, an object of the present invention to provide novel compositions and methods of hydrating hydraulic cement in which the cement can be readily manipulated, shaped, and formed into a strong low density material.

An additional important object of the present invention is to provide novel low density hydraulic cement composite compositions and methods which do not subject the aggregates, fibers, fillers, and powders to hostile or destructive forces.

A further important object of the present invention is to provide novel hydraulic cement composites in which the cement matrix and the aggregates, fibers, fillers, and powders are deliberately positioned into a desired mechanically self-supporting configuration prior to hydrating the cement, thereby enabling unique composite configurations to be prepared.

Yet another important object of the present invention is to provide novel hydraulic cement compositions having internal voids with a predetermined size, shape, and distribution.

These and other objects and features of the present invention will become more fully apparent from the following description and appended claims, or may be learned by the practice of the invention.

DETAILED DESCRIPTION OF THE PREFERRED EMBODIMENTS

The present invention provides novel low density hydraulically bonded cement compositions and methods for their preparation and use. The low density is a result of internal voids formed in the cement composition. The voids are formed by compressing powdered hydraulic cement or cement paste with a solid removable aggregate material which will later undergo a phase change and leave voids in the final cement product. Typical phase changes include melting, volatilizing, evaporating, and dissolving.

Typical solid removable aggregate materials which may be used within the scope of the present invention include ice, dry ice, frozen aqueous solutions, and certain salts, which leave voids in the final cement product after they melt, volatilize, evaporate, or dissolve. Aqueous solutions include water solutions containing one or more solutes or ions dissolved therein which modify the hydration of hydraulic cement. The solid removable aggregates are capable of being completely removed from the cement article so as to minimize the weight of the final article. Furthermore, the solid removable aggregates are capable of being pressed with the cement into the desired shape without being crushed. Accordingly, as the solid removable aggregates undergo their phase change, they leave a void substantially corresponding to the initial size and shape of the removable aggregate.

The compositions and methods of the present invention involve the use of the family of cements known as hydraulic cements. Hydraulic cement is characterized by the hydration products that form upon reaction with water. It is to be distinguished from other cements such as polymeric organic cements. The term, "powdered hydraulic cement", as used herein, includes clinker, crushed, ground, and milled clinker in various stages of pulverizing and in various particle sizes. The term powdered hydraulic cement also includes cement particles which may have water associated with the cement; however, the water content of the powdered hydraulic cement is preferably sufficiently low that the cement particles are not fluid. The water to cement ratio is typically less than about 0.20. When powdered hydraulic cement is used, the cement compositions within the scope of the present invention are hydrated without mechanical mixing of the cement and water.

Examples of typical hydraulic cements known in the art include: the broad family of Portland cements (including ordinary Portland cement without gypsum), calcium aluminate cements (including calcium aluminate cements without set regulators, e.g., gypsum), plasters, silicate cements (including $\beta$ dicalcium silicates, tricalcium silicates, and mixtures thereof), gypsum cements, phosphate cements, and magnesium oxychloride cements.

Hydraulic cements generally have particle sizes ranging from 0.01 µm to 100 µm. The cement particles may be gap graded and recombined to form bimodal, trimodai, or other polymodal systems to improve packing efficiency. For example, a trimodal system having a size ratio of 1:5:25 and a mass ratio of 21.6:9.2:69.2 (meaning that 21.6% of the particles, by weight, are of size 1 unit and 9.2% of the particles, by weight, are of size 5 units and 69.2% of the particles, by weight, are of size 25 units) can theoretically result in 85% of the space filled with particles after packing.

Another trimodai system having a size ratio of 1:7:49 and a mass ratio of 13.2:12.7:66.1 can theoretically result in 88% of the space filled with particles after packing. In yet another trimodal system having the same size ratio of 1:7:49 but a different mass ratio of 11:14:75 can result in 95% of the space filled with particles after packing. It will be appreciated that other particle size distributions may be utilized to obtain desired packing densities.

A bimodal system having a size ratio of 0.2:1 and a mass ratio of 30:70 (meaning that 30% of the particles, by weight, are of size 0.2 units and 70% of the particles, by weight, are of size 1 unit) can theoretically result in 72% of the space filled with particles after packing. Another bimodal system having a size ratio of 0.15:1 and a mass ratio of 30:70 can result in 77% of the space filled with particles after packing.

1. Positioning the Hydraulic Cement

In general, the cement compositions within the scope of the present invention are prepared by deliberately positioning a powdered hydraulic cement or cement paste and a solid removable aggregate material which is capable of melting, evaporating, volatilizing, or dissolving, at a pressure sufficiently high to form a mechanically self-supporting structure having a desired near net final position prior to hydration of the powdered hydraulic cement.

The term "mechanically self-supporting structure" as used within the specification and appended claims is intended to include an article which is capable of being removed from its mold after being pressed into its final shape and maintaining its shape for extended periods of time under gravitational forces absent any external support such as a mold. The article is also capable of being moved and hydrated, under processes such as immersion in an aqueous solution and exposure to water vapor, and still maintain its shape without external support. Obtaining a mechanically self-supporting structure requires packing the hydraulic cement and aggregate mixtures to a density greater than the natural densities of cement and aggregate. As used herein, the term "natural density" is defined as the density of particles placed in a container without packing. The percent volume of air in a cement powder at its natural density is usually about 50% or less.

The term "near net final position" is intended to include a configuration corresponding substantially to the desired configuration of the final cement article. Thus, once the desired configuration of the final cement article is determined, the powdered hydraulic cement or cement paste and solid removable aggregate material are positioned into a configuration corresponding substantially to that final configuration, after taking into consideration the possibility that there may be some slight swelling or shrinking during cement hydration, depending upon the reaction parameters selected.

The positioning of cement and solid removable aggregate material into a mechanically self-supporting structure of the present invention usually involves pressure compaction processes, vibratory compaction process, or a combination of pressure compaction and vibratory compaction.

Pressure compaction processes such as dry pressing and isostatic pressing may be used to position the powdered hydraulic cement or cement paste and the solid removable aggregate material into the desired predetermined configuration prior to complete hydration.

Dry pressing consists of compacting particles between die faces in an enclosed cavity. The pressure must be sufficient to position the cement and solid aggregate material into a mechanically self-supporting structure. Pressures can range from about 500 psi to greater than 200,000 psi in normal practice. Typical pressures are greater than 10,500 psi. Higher pressures are generally avoided when easily meltable or volatilizable removable aggregate materials are used. Thus, thermodynamic constraints must be considered when pressing meltable and volatilizable removable aggregates materials.

Dry pressing is generally used for high production rates of small parts but, can be used for any size part for which equipment is available. Complex shapes are often pressed, but simple flat shapes having substantially parallel faces have the best geometry for pressing. Shapes having varying cross-section thicknesses present problems of obtaining uniform compaction due to nonuniform pressure transfer through the cross section.

In some cases additives are mixed with the powdered hydraulic cement to make molding easier and to provide sufficient strength so that the article does not crumble upon removal from the press. Grading the cement particles, as discussed above, may also provide a certain fluidity of the cement powder during compressing.

Because cement particles are formed by crushing and grinding larger cement clinker pieces, the individual particles have rough edges. It has also been found that rounding the edges of the cement particles enhances their ability to slide over each other, thereby improving the packing efficiency of the cement particles.

Some of the air enclosed in the pores of the loose powder has to be displaced during pressing. The finer the mix and the higher the pressing rate, the more difficult the escape of air. The air may then remain compressed in the mix. Upon rapid release of the pressure, the pressed piece can be damaged by cracks approximately perpendicular to the direction of pressing. This pressure delamination, even though almost imperceptible, may weaken the resulting product. This problem is usually solved by repeated application of pressure or by releasing the pressure more slowly. It is also beneficial to press the cement mixture in a vacuum environment, thereby minimizing the amount of air that can be trapped between the particles. Other known techniques may also be used to solve this problem.

Isostatic pressing is a pressure compaction process in which pressure is exerted uniformly on all surfaces of the cement article. The method is particularly suitable in forming of symmetric shapes, and is similarly employed in the shaping of large articles which could not be pressed by other methods. In practice, the powdered mix or cement paste is encased in a pliable rubber or polymer mold. Hollow shapes are prepared by placing a mandrel in the mold and pouring the powdered hydraulic cement between the mandrel and the walls of the pliable mold. Vibration is often used to help pack the mix into the mold cavity.

The mold is then preferably sealed, evacuated to a pressure between 0.1 atm and 0.01 atm, placed in a high-pressure vessel, and gradually pressed to the desired pressure. An essentially noncompressible fluid such as high-pressure oil or water is preferably used. Pressures sufficient to create a mechanically self-supporting structure may range from about 500 psi to about 200,000 psi. Typical pressures are greater than 10,000 psi. The forming pressure is preferably gradually reduced before the part is removed from the mold.

Vibrational compaction techniques, as described more fully in copending patent application Ser. No. 07/526,231, now abandoned may be used to help pack the mix into the mold cavity so as to form a mechanically self-supporting structure. In vibrational compaction processes, the powdered hydraulic cement particles or cement pastes are typically compacted by low-amplitude vibrations. Inter-particle friction is overcome by application of vibrational energy, causing the particles to pack to a density consistent with the geometric and material characteristics of the system and with the conditions of vibration imposed. Vibration packing is considered a "pressure" process, within the scope of the specification and appended claims, because it is the pressure of each particle acting upon the others which imparts the desired shape and strength to the article.

Packed densities as high as 100% of theoretical are possible using vibration packing processes. As used herein, the term "theoretical packing density" is defined as the highest conceivable packing density achievable with a given powder size distribution. Hence, the theoretical packing density is a function of the particle size distribution. Vibration packing processes may also be combined with pressure compaction processes to more rapidly obtain the desired packing densities or even higher packing densities.

Typical vibration frequencies may range from 1 Hz to 20,000 Hz, with frequencies from about 100 Hz to about 1000 Hz being preferred and frequencies from about 200 Hz to about 300 Hz being most preferred. Typical amplitudes may range from about one half the diameter of the largest cement particle to be packed to about 3 mm, with amplitudes in the range from about one half the diameter of the largest cement particle to about 1 mm. If the amplitude is too large, sufficient packing will not occur.

Once the amplitude is determined, the frequency may be varied as necessary to control the speed and rate of packing. For particle sizes in the range from 0.1 µm to 50 µm, the vibration amplitude is preferably in the range from about 10 µm to about 500 µm. Although it is not necessary to have a specific particle size distribution in order to successfully use vibrational compaction processes, carefully grading the particle size distribution usually improves compaction.

The processing techniques for preparing low density cement products within the scope of the present invention generally involve compacting the powdered hydraulic cement or cement paste with a solid removable aggregate which later melts, dissolves, volatilizes, evaporates, or undergoes some other phase change, leaving a void. Typical solid removable aggregates of this type include ice, dry ice, frozen aqueous solutions, and certain salts. Such aggregates are water soluble and are capable of being entirely removed from the cementitious article as the aggregates undergo their phase change. Aqueous solutions often contain calcium or other ions typically found in the aqueous phase of cement paste.

The term "dissolvable solid aggregate" as used in the specification and appended claims is limited to non-aqueous solids such as salts and does not include frozen aqueous solutions. The term "volatile solid aggregate" as used in the specification and appended claims is limited to solids that pass directly from a solid state to a gaseous or vapor state without entering a liquid state, for example, dry ice.

The removable aggregate material particle size and shape determines the size and shape of the resulting voids in the cement product, and the size and quantity of voids affects the density and strength characteristics of the final cement product.

For example, it is within the scope of the present invention to pack a mixture of cement and ice. As the ice melts, water from the ice hydrates the cement, leaving voids where the ice was originally located. The resulting cement product is filled with voids of controlled size, shape, and distribution and is strong and lightweight.

Care must be taken when using salt with a cement paste so that the salt granules do not dissolve into the aqueous phase of the cement paste before the cement paste is positioned into the desired configuration. To avoid this, low water to cement ratios preferably in the range from about 0.01 to about 0.5, more preferably in the range from about 0.1 to about 0.4, and most preferably in the range from about 0.2 to about 0.35, are used. In addition, once the salt is combined with the cement paste, the composition is preferably processed quickly.

Cement pastes may be advantageously used instead of powdered hydraulic cement in lower strength applications. Where high strength is not necessary, cement pastes require less processing than powdered hydraulic cement thereby enabling lower cost cement products to be produced.

Suitable salts which may be used within the scope of the present invention are preferably soluble and do not detrimentally affect the durability of the cement or any removable aggregates, such as reinforcement metal, added to the cement product. Typical salts include: chlorides, such as NaCl, including rock salt, and $SrCl_2$, carbonates such as $Na_2CO_3$, bicarbonates such as $NaHCO_3$, and sulfates such as $Na_2SO_4$. Generally, alkali and alkaline earth metal salts are preferred.

2. Aggregates and Composite Materials

In addition to meltable, volatilizable, dissolvable, and evaporative removable aggregate materials, it is within the scope of the present invention to also include aggregates commonly used in the cement industry. Examples of such aggregates include sand, gravel, silica fume, pumice, perlite, and vermiculite. One skilled in the art would know which aggregates to use to achieve desired characteristics in the final cement article.

For many uses it is preferable to include a plurality of differently sized aggregates capable of filling interstices between the aggregates and the powdered hydraulic cement so that greater density and strength can be achieved. In such cases, the differently sized aggregates have particle sizes in the range from about 0.01 µm to about 2 cm. The chosen particle size is limited by the desired use of the final cement article, but in any event, the cement article should have a thickness at least 4 times the diameter of the largest aggregate particles.

In addition to conventional aggregates used in the cement industry, a wide variety of other aggregates, including unique fillers, fibers, strengtheners, including metals and metal alloys such as stainless steel, iron, copper, silver, and gold, balls, filings, pellets, powders, and fibers such as graphite, silica, alumina, fiberglass, polymeric fibers, and such other fibers typically used to prepare composites, may be combined with the powdered hydraulic cement prior to hydration.

It is also within the scope of the present invention to add lightweight aggregates, having a density less than the hydraulic cement, to the cement to lower the density of the resulting compound. Typical aggregates may include inorganic aggregates such as pumice, perlite, and vermiculite, and organic polymers such as styrofoam and urethane foams. Suitable aggregates do not have to be capable of bonding with the hydraulic cement; entrapment of the aggregate within the cement matrix may be sufficient.

An important advantage of positioning the powdered hydraulic cement into a desired configuration prior to hydration is that many useful aggregates may be placed within the cement article without subjecting the aggregates to hostile and damaging mixing forces usually associated with forming a cement paste. High shear mixing, for instance, can cause breaking and agglomeration of aggregates.

Accordingly, aggregates which would agglomerate, break, or otherwise be rendered ineffective during mixing or other shear processing can be used with the present invention even though they might non be suitable for use in other cement processing techniques. In fact, it is possible to prepare custom designed composite materials having a cement matrix using the principles within the scope of the present invention.

For example, thermally and electrically conducting aggregates, such as metal fibers, wires, powders, spheres (solid or having a conductive coating), and electrically conducting polymers, may be mixed with the powdered hydraulic cement or even deliberately positioned within the powdered hydraulic cement prior to hydration. Such electrically conducting aggregates may be used to conduct electricity through the cement article or dissipate electric charge from the cement article.

Electrical conductors can also provide a radio frequency shield which would insulate and protect sensitive electronic equipment from electrical interference, static, and electromagnetic shock waves. It has been found that aggregates such as stainless steel and iron filings be may positioned and laminated within custom designed cement articles to provide magnetic, radio frequency shielding, and electrical and thermal conducting properties.

3. Cement Hydration Techniques
a. Cement Hydration in General

The term "hydration" as used herein is intended to describe the chemical reactions that take place between the cement and water. The chemistry of hydration is extremely complex and can only be approximated by studying the hydration of pure cement compounds. For simplicity in describing cement hydration, it is often assumed than the hydration of each compound takes place independently of the others that are present in the cement mixture. In reality, cement hydration involves complex interrelated reactions of each compound in the cement mixture.

With respect to Portland cement, the principal cement components are dicalcium silicate and tricalcium silicate. Portland cement generally contains smaller amounts of tricalcium aluminate ($3CaO \cdot Al_2O_3$) and tetracalcium aluminum ferrite ($4CaO \cdot Al_2O_3 \cdot FeO$). The hydration reactions of the principal components of Portland cement are abbreviated as follows:

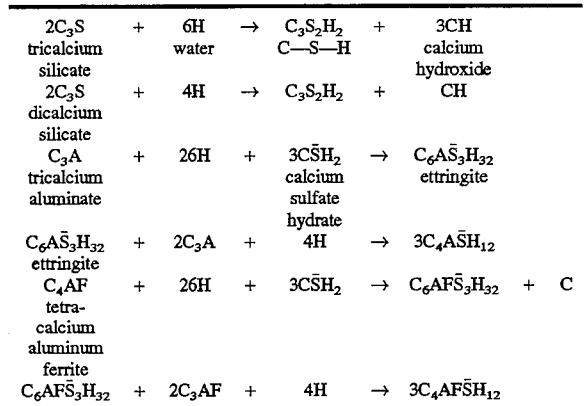

where dicalcium silicate is $2CaO \cdot SiO_2$, tricalcium silicate is $3CaO \cdot SiO_2$, calcium hydroxide is $Ca(OH)_2$, water is $H_2O$, $\bar{S}$ is sulfate, and C—S—H ("calcium silicate hydrate") is the principal hydration product. (The formula $C_3S_2H_2$ for calcium silicate hydrate is only approximate because the composition of this hydrate is actually variable over a wide range ($0.9<C:S<3.0$). It is a poorly crystalline material which forms extremely small particles in the size of colloidal matter less than $0.1$ μm in any dimension. It will be appreciated that there are many other possible hydration reactions that occur with respect to other hydraulic cements and even with respect to Portland cement.

On first contact with water, C and S dissolve from the surface of each $C_3S$ grain, and the concentration of calcium and hydroxide ions rapidly increases. The pH rises to over 12 very rapidly. The rate of this hydrolysis slows down quickly but continues throughout a dormant period if gypsum or other set regulating chemicals are present. After several hours under normal conditions, the hydration products, CH and C—S—H, start to form rapidly, and the reaction again proceeds rapidly. Dicalcium silicate hydrates in a similar manner, but is much slower because it is a less reactive compound than $C_3S$. For additional information about the hydration reactions, reference is made to F. M. Lea, *Chemistry of Cement and Concrete*, 3rd edition, pp. 177–310 (1970).

It has been observed that the better the contact between individual cement particles, both before and during hydration, the better the hydration product and the better the strength of the bond between the particles. Hence, the positioning of cement particles in close proximity one to another before and during hydration plays an important role in the strength and quality of the final cement article.

b. Hydration With Gaseous and Liquid Water

It is within the scope of the present invention to hydrate the powdered hydraulic cement after the cement particles and solid removable aggregate material have been deliberately positioned into a mechanically self-supporting structure having a predetermined configuration. Hydration is accomplished without mechanical mixing of the cement and water. Thus, diffusion of water (both gaseous and liquid) into the preconfigured cement article is an important hydration technique within the scope of the present invention.

When hydration is achieved by contacting the cement article with gaseous water, the gas may be at atmospheric pressure; however, diffusion of the water into the article, and subsequent hydration, may be increased if the gaseous water is under pressure. The pressure may range from 0.001 torr to about 2000 torr, with pressures from about 0.1 torr to 1000 torr being preferred, and pressures from about 1 torr to about 50 torr being most preferred. Even though water vapor is introduced into the cement compact, it is possible that the water vapor may immediately condense into liquid water within the pores of the cement compact. If this happens, then gaseous water and liquid water may be functional equivalents.

Atomized liquid water may, in some cases, be used in place of gaseous water vapor. As used herein, atomized water is characterized by very small water droplets, whereas gaseous water is characterized by individual water molecules. Gaseous water is currently preferred over atomized water under most conditions because in can permeate the pore structure of the cement article better than atomized water.

The temperature during hydration can affect the physical properties of the hydrated cement article. Therefore, it is important to be able to control and monitor the temperature during hydration. Cooling the cement article during hydration may be desirable to control the reaction rate.

The gaseous water may also be combined with a carrier gas. The carrier gas may be reactive, such as carbon dioxide or carbon monoxide, or the carrier gas may be inert, such as argon, helium, or nitrogen. Reactive carrier gases are useful in controlling the morphology and chemical composition of the final cement article. Reactive carrier gases may be used to treat the hydraulic cement article before, during, and after hydration.

The partial pressure of the water vapor in the carrier gas may vary from about 0.001 torr to about 2000 torr, with 0.1 torr to about 1000 torr being preferred, and 1 torr to about 50 torr being most preferred. An autoclave may be conveniently used to control the gaseous environment during hydration. It is also possible to initially expose the cement article to water vapor for a period of time and then complete the hydration with liquid water. In addition, the cement article may be initially exposed to water vapor and then to carbon dioxide.

Heating the gaseous water will increase the rate of hydration. Temperatures may range from about 25° C. to about 200° C. It should be noted that the temperature at which hydration occurs affects certain physical characteristics of the final cement article, especially if an additional silica source is added. For example, when hydration temperature is greater than 50° C., the formation of a hydrogarnet crystalline phase is observed, and when the hydration temperature is greater than 85° C. other crystalline phases are observed. These crystalline phases, which often weaken the cement structure, are not always desirable. However, in some cases, the pure crystalline phases may be desired. In order to form the pure crystalline phase, it is important to use pure starting materials and to accurately control the hydration temperature.

Cement pastes may be hydrated underwater, in steam, or in an autoclave. In addition to the foregoing hydration techniques, cement pastes may require some additional processing to complete the hydration process. For instance, w heat treatment to about 200° C. after 24 hours improves the ultimate degree of hydration, durability, and density of reaction products.

c. The Effect of Carbon Dioxide on Hydration

The inventors have found that when carbon dioxide is introduced during the stages of hydration, significant structural benefits can be realized, such as high strength and reduced shrinkage on drying. Some of these concepts are disclosed in U.S. Pat. No. 5,232,496 to Jennings et al., entitled PROCESS FOR PRODUCING IMPROVED BUILDING MATERIAL AND PRODUCT THEREOF, which is incorporated herein by specific reference.

More specifically, as applied to the hydraulically bonded cement compositions and methods within the scope of the present invention, it has been found that $CO_2$ can be used to prepare cement articles having improved water resistance, surface toughness, and dimensional stability. These results may be obtained by exposing the cement article to a $CO_2$ atmosphere while rapidly desiccating the cement article. For best results, the $CO_2$ is preferably at a pressure greater than one atmosphere. However, $CO_2$ pressures less than one atmosphere are also useful.

In addition, it is believed the $CaCO_3$ seals the exterior surface of the cement article so that it is no longer porous to water, even salt water. It has been observed that as water evaporates, the cement article loses strength because of dimensional changes due to loss of water. The $CaCO_3$ layer formed on the exterior surface prevents water in the interior of the cement article from evaporating so that the cement article stays very strong.

d. Control of the Aqueous Solution

Aqueous solutions may also be used to hydrate preconfigured cement articles either as a frozen removable aggregate material or as a solution into which a formed cement product is immersed. As used herein, the term aqueous solution refers to a water solvent having one or more solutes or ions dissolved therein which modify the hydration of hydraulic cement in a manner different than deionized water. For instance, it is possible to simply immerse the unhydrated cement article in lime water to achieve adequate hydration. Lime water is an aqueous solution containing $Ca^{2+}$ and $OH^-$ ions formed during the hydration reactions. Because of the presence of hydroxide ions, lime water typically has a pH in the range from about 9 to about 13.

Other aqueous solutions, such as extracts from cement paste, silica gel, or synthetic solutions may be used to hydrate the preconfigured cement articles. Other ions in addition to $Ca^{2+}$ and $OH^-$, such as carbonates, silica, sulfates, sodium, potassium, iron, and aluminum, may also be included in aqueous phase solutions. In addition, solutes such as sugars, polymers, water reducers, and superplasticizer may be used to prepare aqueous solutions within the scope of the present invention.

A typical aqueous solution within the scope of the present invention may contain one or more of the following components within the following ranges:

| Component | Concentration (ppm) | Most Preferred Concentration (ppm) |
|---|---|---|
| calcium | 50–3000 | 400–1500 |
| silicon | 0–25 | 0.25–5 |
| carbon | 0–5000 | 5–250 |
| iron | 0.001–10 | 0.01–0.2 |
| aluminum | 0.001–10 | 0.01–0.2 |
| sulfur | 0–5000 | 200–2000 |
| sodium | 0–2000 | 400–1500 |
| potassium | 0–4000 | 800–2000 |
| sugars | sdr | sdr |
| polymers | sdr | sdr |
| water reducers | sdr | sdr |
| superplasticizer | sdr | sdr |

Where the term "sdr" refers to the standard dosage rate used in the concrete industry, and where the term "ppm" means the number of component atoms or molecules containing the component compound per million molecules of water. pH meters and spectrometers which analyze absorbed and emitted light are examples of apparatus capable of monitoring the concentrations of ions in the aqueous solution.

EXAMPLES

Various hydraulic cement compositions and their methods of manufacture within the scope of the present invention will be further clarified by a consideration of the following examples, which are intended to be purely exemplary of the use of the invention and should not be viewed as a limitation on any claimed embodiment.

Examples 1–3

In these examples, lightweight, high porosity cement disks were prepared by compressing ground and graded ice in dry powdered hydraulic cement. The ice particles, which were obtained by spraying water into liquid nitrogen, acted like a fine sand aggregate used in preparing conventional mortars. The compact disks, having a 45 mm diameter and 8 mm thickness, were prepared by placing hydraulic cement powder (either grey or white cement) and ice particles within a precision made steel die and compressing from both ends under a pressure in the range from about 13,000 psi to about 14,000 psi. The die (both the mold and the plunger), the cement powder, balance, and the mixing pan were kept in a super-cooled chamber to avoid ice melting. After loading the mixture in the die, the mixture was quickly moved to the press and compacted.

The compact disks were carefully removed from the die and cured immediately in an autoclave at 100% relative humidity and in an atmosphere containing $CO_2$. The disks were desiccated and further carbonated to improve strength. Before being treated with carbon dioxide, the disks had a dull appearance. After treatment with carbon dioxide, the disks all had a natural glaze appearance.

The "grey" cement was ordinary Portland cement, manufactured by Ideal Cement Company or Lonestar Cement Company, having the following approximate composition: 20% $SiO_2$, 5% $Al_2O_3$, and 65% CaO, and 2.5% FeO, by bogue analysis. The "white" cement was Atlas White cement having the following approximate composition: 21% $SiO_2$, 3% $Al_2O_3$, 62% CaO, by bogue analysis.

The surface hardness (Hrb test) and density were measured for each disk. The term "Hrb" refers to Hardness Rockwell scale "b." Uniform pores were observed in the disk. Table 1 summarizes the experimental parameters and results of Examples 1–3.

TABLE 1

| Example | cement type | packing pressure (psi) | surface hardness (Hrb) | ice:cement ratio | density gm/cm³ |
|---|---|---|---|---|---|
| 1 | Ideal | 14,000 | >20 | 50:50 | 1.35 |
| 2 | Ideal | 13,000 | >20 | 50:50 | 1.3 |
| 3 | Ideal | 12,000 | >20 | 50:50 | 1.3 |

Examples 4–6

In this example lightweight, high porosity cement disks were prepared according to the procedure of Examples 1–3, except that ground and graded frozen aqueous solution was used instead of ice. The frozen aqueous solution particles were obtained by spraying aqueous solution into liquid nitrogen. The aqueous solution was prepared by making a cement paste having a 0.4 water to cement ratio and mixing the cement paste for 5 minutes. The aqueous phase was extracted from the paste and diluted with water to form a 10% aqueous solution.

The surface hardness (Hrb test) and density were measured for each disk. Uniform pores were observed in the disk. Table 2 summarizes the experimental parameters and results of Examples 4–6.

TABLE 2

| Example | cement type | packing pressure (psi) | surface hardness (Hrb) | ice:cement ratio | density gm/cm³ |
|---|---|---|---|---|---|
| 4 | Ideal | 10000 | >30 | 50:50 | 1.45 |
| 5 | Ideal | 12000 | >30 | 50:50 | 1.5 |
| 6 | Ideal | 14000 | >30 | 50:50 | 1.5 |

Examples 7–9

In this example lightweight, high porosity cement disks were prepared according to the procedure of Examples 1–3, except that ground and graded dry ice was used instead of ice, and the disks were heated in steam at 150° C. during the hydration process. Similar physical properties were observed between the disks of Examples 1–3 and the disks of Example 7–9, except that the strength gain was much quicker using dry ice particles rather than ice.

The surface hardness (Hrb test) and density were measured for each disk. Uniform pores were observed in the disk. Table 3 summarizes the experimental parameters and results of Examples 7–9.

TABLE 3

| Example | cement type | packing pressure (psi) | surface hardness (Hrb) | dry ice:cement ratio | density gm/cm³ |
|---|---|---|---|---|---|
| 7 | Ideal | 11000 | >20 | 50:50 | 1.35 |
| 8 | Ideal | 2000 | >10 | 50:50 | 1.25 |
| 9 | Ideal | 1000 | >10 | 50:50 | 1.15 |

Examples 10–21

In this example lightweight cement disks of high uniform porosity were prepared by compressing a mixture of dry powdered hydraulic cement and soluble granulated salts. The compact disks, having a 4.5 cm diameter and 0.5 cm thickness, were prepared using the die and press described in connection with Examples 1–3. The cement/salt mixture was placed in the die subjected to a load in the range from 2000 to 50,000 pounds (approximately 1000 to 20,000 psi). The disks were removed and cured for 6 hours at atmospheric pressure and 100° C. at 100% relative humidity under autoclave conditions. Thereafter, the system was purged with carbon dioxide gas for 30 to 60 minutes. The disks were then placed under running water for 24 hours for complete leaching of the salts. Uniform pores were observed in the disk.

The surface hardness (Hrb test) and density were measured for each disk. Uniform pores were observed in the disk. Table 4 summarizes the experimental parameters and results of Examples 10–21.

TABLE 4

| Example | cement type | packing pressure (psi) | surface hardness (Hrb) | salt:cement ratio | density gm/cm³ | Salt |
|---|---|---|---|---|---|---|
| 10 | Ideal | 1000 | >30 | 50:50 | 1.2 | NaCl |
| 11 | Ideal | 2000 | >30 | 50:50 | 1.25 | NaCl |
| 12 | Ideal | 11000 | >40 | 50:50 | 1.3 | NaCl |
| 13 | Ideal | 20000 | >50 | 50:50 | 1.35 | NaCl |
| 14 | Ideal | 1000 | >20 | 50:50 | 1.2 | SrCl₂ |
| 15 | Ideal | 2000 | >30 | 50:50 | 1.25 | SrCl₂ |
| 16 | Ideal | 11000 | >30 | 50:50 | 1.35 | SrCl₂ |
| 17 | Ideal | 20000 | >35 | 50:50 | 1.4 | SrCl₂ |
| 18 | Ideal | 1000 | >30 | 50:50 | 1.25 | CaHCO₃ |
| 19 | Ideal | 2000 | >30 | 50:50 | 1.3 | CaHCO₃ |
| 20 | Ideal | 11000 | >35 | 50:50 | 1.35 | CaHCO₃ |
| 21 | Ideal | 20000 | >40 | 50:50 | 1.4 | CaHCO₃ |

Examples 22–25

In this example lightweight cement disks of high uniform porosity were prepared according to the general procedure of Examples 10–21, except that upon removal from the die, the disks were soaked in lime water for 24–48 hours. Thereafter, the disks were carbonated with carbon dioxide in a desiccating environment. The lime water partially dissolved the salts. Water leaching was necessary for complete removal of the The surface hardness (Hrb test) and density were measured for each disk. Uniform pores were observed in the disk. Table 5 summarizes the experimental parameters and results of Examples 22–25.

TABLE 5

| Example | cement type | packing pressure (psi) | surface hardness (Hrb) | salt:cement ratio | density gm/cm³ | Salt |
|---|---|---|---|---|---|---|
| 22 | Ideal | 1000 | >30 | 50:50 | 1.2 | CaHCO₃ |
| 23 | Ideal | 2000 | >30 | 50:50 | 1.25 | CaHCO₃ |
| 24 | Ideal | 11000 | >35 | 50:50 | 1.4 | CaHCO₃ |
| 25 | Ideal | 20000 | >40 | 50:50 | 1.5 | CaHCO₃ |

Example 26

In this example a lightweight cement disk of high uniform porosity was prepared according to the general procedure of Examples 10–21, except that metal filings were also added to the powdered hydraulic cement prior to compression within the die. Upon removal from the die, the disk was hydrated in lime solution for 24 hours. Thereafter, the disk was carbonated with carbon dioxide in a desiccating environment. Uniform pores were observed in the disk, and the metal filings were dispersed throughout the disk. The flexural strength, as measured in a 4 point bend test, was found to be ≈10 MPa. The surface hardness (Hrb test) was >50. The density of the disk was 1.6 g/cm$^3$.

Example 27

In this example a lightweight cement disk of high uniform porosity was prepared by compressing ground and graded ice in low water to cement ratio cement pastes. The ice particles, which were obtained by spraying water into liquid nitrogen, acted like a fine sand aggregate used in preparing conventional mortars. The compact disk, having a 4.5 cm diameter and 1.0 cm thickness, was prepared by placing cement paste and ice particles within a precision made steel die and compressing from both ends under a pressure in the range from about 10500 psi to about 14000 psi. The die (both the mold and the plunger), the cement paste, balance, and the mixing pan were kept in a super-cooled chamber to avoid ice melting. After loading the mixture in the die, the mixture was quickly moved to the press and compacted.

The compacted disk was carefully removed from the die, carbonated, and cured immediately at 100% relative humidity in an autoclave. The disk was desiccated and further carbonated to improve strength. Before being treated with carbon dioxide, the disk had a dull appearance. After treatment with carbon dioxide, the disk had a natural glaze appearance.

The cement paste was prepared from ordinary "grey" Portland cement manufactured by Ideal Cement Company having the following approximate composition: 20% $SiO_2$, 5% $Al_2O_3$, and 65% CaO, and 2.5% FeO, by bogue analysis. The cement paste had a water to cement ratio of 0.03 and was prepared by mixing cement and water in a Bosch mixer. The surface hardness (Hrb test) was >20. The density of the disk was 1.45 g/cm$^3$.

Example 28

In this example a lightweight cement disk of high uniform porosity was prepared according to the procedure of Example 27, except that white cement was used to prepare the cement paste. The "white" cement was Atlas White cement having the following approximate composition: 21% $SiO_2$, 3% $Al_2O_3$, 62% CaO, by bogue analysis.

Example 29

In this example a lightweight cement disk of high uniform porosity was prepared by adding ground and graded ice to a cement paste and casting the cement paste into a 5 cm by 2 cm mold at low temperatures (<5° C.) to control the initial melting of the ice in the paste. The ice particles were obtained according to the procedure of Examples 1–3. The paste was kept in the refrigerator before adding the ice to reach equilibrium (≈10–30 mins.) The ice was then mixed in the paste and placed in the mold. The molding was done in the refrigerator, and the paste was left in the refrigerator for 3 to 4 hours to reach initial stiffening. Thereafter, the disks were removed from the refrigerator and cured in an autoclave at 100% relative humidity and carbonated for 7 hours. The surface hardness (Hrb) was >20. The density of the disk was <1.00 gm/cm$^3$.

Example 30

A lightweight cement disk of high uniform porosity was prepared according to the procedure of Example 29, except that ground and graded frozen aqueous solution was used instead of ice. The aqueous solution was prepared by making a cement paste having a 0.4 water to cement ratio and mixing the cement paste for 5 minutes. The aqueous phase was extracted from the paste and diluted with water to form a 10% aqueous solution. The surface hardness (Hrb) was >20. The density of the disk was <1.00 gm/cm$^3$.

Example 31

In this example a lightweight cement disk of high uniform porosity is prepared according to the procedure of Example 29, except that ground and graded dry ice is used instead of ice. The disk is cured according to the general procedure of Examples 7–9. On account of the rapid sublimation of the dry ice, the cement paste is partially pre-hydrated to give some initial strength to the disk.

Example 32

In this example a lightweight cement disk of high uniform porosity is prepared according to the procedure of Example 29, except that ground and frozen aqueous solution is used instead of ice. The disk is cured according to the general procedure of Examples 4–6. On account of the rapid sublimation of the dry ice, the cement paste is partially pre-hydrated to give some initial strength to the disk.

Example 33

In this example a lightweight cement disk of high uniform porosity is prepared according to the procedure of Example 29, except that soluble granulated salt particles are used instead of ice. The disk is cured according to the general procedure of Examples 10–21. The leaching of the salt particles is quicker when compared to disks prepared with cement powder.

Example 34

In this example, a lightweight cement disk of high uniform porosity is prepared by adding ground and graded ice in cement paste by casting in molds (5 cm×2 cm) under vibratory conditions. The disk is molded at low temperature (<5° C.) to control the initial melting of ice in the paste. The water/cement ratio of cement paste is kept at 0.3 and addition of ice is 40% by weight. The paste is kept in the refrigerator before mixing in the paste to acquire equilibrium (10–30 minutes). Mixing of ice and vibratory molding is done in a cold environment chamber thermostated at <5° C. and left for 3–4 hours to reach initial stiffening. Thereafter, the disk is demolded, cured in an autoclave at 100% relative humidity and carbonated for a number of hours. The surface hardness (Hrb) is >20, and the density is 1.20 g/cm$^3$.

Example 35

A lightweight cement disk of high uniform porosity is prepared according to the procedure of Example 34, except that ground and graded frozen aqueous solution is used instead of ice. The surface hardness (Hrb) of the disk is >20, and the density is 1.20 g/cm$^3$.

SUMMARY

From the foregoing, it will be appreciated that the present invention provides novel compositions and methods of hydrating hydraulic cement in which the cement can be readily manipulated, shaped, and formed into a strong, low density material.

It will be further appreciated that the present invention provides novel hydraulic cement composite compositions and methods which do not subject the aggregates, fibers, fillers, and powders to hostile or destructive forces. Also, novel hydraulic cement composites may be prepared in which the cement matrix and the aggregates, fibers, fillers, and powders are deliberately positioned into the desired configuration prior to hydrating the cement, thereby enabling unique composite configurations.

It will also be appreciated that the present invention provides strong, lightweight, and low cost articles prepared from hydraulic cement as suitable substitutes for more costly plastic and ceramic articles.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A hydraulically bonded article prepared by the process comprising the steps of:
    a. applying pressure to a substantially unhydrated hydraulic cement composition including a solid removable aggregate dispersed therein within a mold such that the hydraulic cement composition is formed into a mechanically self-supporting structure corresponding substantially to a desired configuration of the hydraulically bonded article and such that air within the hydraulic cement composition is substantially removed;
    b. removing the mechanically self-supporting structure from the mold, the mechanically self-supporting structure having sufficient mechanical strength such that it may be hydrated by immersion in water without significant mechanical disruption of the structure;
    c. hydrating the hydraulic cement composition of the mechanically self-supporting structure without substantial mechanical mixing of the hydraulic cement composition and water; and
    d. removing a substantial portion of the solid removable aggregate from the hydraulic cement composition by causing the solid removable aggregate to undergo a phase change, thereby forming the hydraulically bonded article having void spaces therein.

2. A hydraulically bonded article prepared by the process as defined in claim 1, wherein the solid removable aggregate includes individual particles having a size and shape and wherein the void spaces formed upon removal of the solid removable aggregate substantially correspond to the size and shape of the solid removable aggregate particles.

3. A hydraulically bonded article prepared by the process as defined in claim 1, wherein the hydraulically bonded article has a density in a range from about 0.5 g/cm$^3$ to about 2 g/cm$^3$.

4. A hydraulically bonded article prepared by the process as defined in claim 1, wherein the solid removable aggregate is meltable.

5. A hydraulically bonded article prepared by the process as defined in claim 4, wherein the meltable solid removable aggregate includes ice particles.

6. A hydraulically bonded article prepared by the process as defined in claim 4, wherein the meltable solid removable aggregate includes particles formed by freezing an aqueous solution.

7. A hydraulically bonded article prepared by the process as defined in claim 1, wherein the solid removable aggregate is volatilizable.

8. A hydraulically bonded article prepared by the process as defined in claim 7, wherein the volatilizable solid removable aggregate includes dry ice.

9. A hydraulically bonded article prepared by the process as defined in claim 1, wherein the solid removable aggregate is dissolvable.

10. A hydraulically bonded article prepared by the process as defined in claim 9, wherein the dissolvable solid removable aggregate includes granulated salt.

11. A hydraulically bonded article prepared by the process as defined in claim 1, wherein the hydraulic cement composition includes powdered hydraulic cement.

12. A hydraulically bonded article prepared by the process as defined in claim 1, wherein the hydraulic cement composition is hydrated by contacting the hydraulic cement composition with an aqueous solution.

13. A hydraulically bonded article prepared by the process as defined in claim 1, wherein the hydraulic cement composition is hydrated in a controlled gaseous environment including carbon dioxide.

14. A hydraulically bonded article prepared by the process as defined in claim 1, wherein the hydraulic cement composition is hydrated by contacting the hydraulic cement composition with water vapor.

15. A hydraulically bonded article prepared by the process as defined in claim 1, wherein the hydraulic cement composition is hydrated by contacting the hydraulic cement composition with atomized water.

16. A hydraulically bonded article prepared by the process as defined in claim 1, wherein the hydraulic cement composition is hydrated by autoclaving the hydraulic cement composition under elevated pressure and temperature.

17. A hydraulically bonded article prepared by the process as defined in claim 1, wherein the hydraulic cement composition is hydrated by immersing the mechanically self-supporting structure in water.

18. A hydraulically bonded article having a low density prepared by the process comprising the steps of:
    a) placing a substantially unhydrated hydraulic cement composition into a mold, the hydraulic cement composition including a hydraulic cement binder and a removable aggregate;
    b) compressing the hydraulic cement composition within the mold in order to form the substantially unhydrated hydraulic cement composition into a mechanically self-supporting structure corresponding substantially to a desired configuration of the hydraulically bonded article and to remove a substantial portion of air from within the hydraulic cement composition;
    c) removing the mechanically self-supporting structure from the mold, the mechanically self-supporting structure having sufficient mechanical strength such that it may be hydrated by immersion in water without significant mechanical disruption of the structure;
    d) hydrating the hydraulic cement composition of the mechanical self-supporting structure with water without substantial mechanical mixing of the hydraulic cement composition and water; and
    e) removing the removable aggregate from the hydraulic cement composition of the mechanically self-supporting structure by causing the removable aggregate to undergo a phase change, the removal of the removable aggregate leaving a predetermined level of porosity within the hydraulically bonded article, thereby forming the hydraulically bonded article having low density.

19. A hydraulically bonded article as defined in claim 18, wherein the hydraulically bonded article has a density in a range from about 0.5 g/cm³ to about 2 g/cm³.

20. A hydraulically bonded article as defined in claim 18, wherein the hydraulic cement composition is compressed under a pressure in a range from about 1000 psi to about 200,000 psi.

21. A hydraulically bonded article as defined in claim 18, wherein the hydraulic cement composition is compressed under a pressure greater than about 10,000 psi.

22. A hydraulically bonded article as defined in claim 18, wherein the hydraulic cement composition is compressed using isostatic pressing.

23. A hydraulically bonded article as defined in claim 18, wherein the hydraulic cement composition is compressed using dry pressing.

24. A hydraulically bonded article as defined in claim 18, wherein the hydraulic cement composition is compressed using vibratory packing.

25. A hydraulically bonded article as defined in claim 18, wherein the hydraulic cement composition is compressed in a vacuum environment.

26. A hydraulically bonded article as defined in claim 18, wherein the hydraulic cement binder includes a portland cement.

27. A hydraulically bonded article as defined in claim 18, wherein the water used to hydrate the hydraulic cement composition includes gaseous water.

28. A hydraulically bonded article as defined in claim 27, wherein the gaseous water has a vapor pressure in a range from about 0.1 torr to about 1000 torr.

29. A hydraulically bonded article as defined in claim 18, wherein the water used to hydrate the hydraulic cement composition includes atomized water.

30. A hydraulically bonded article as defined in claim 18, wherein the water used to hydrate the hydraulic cement composition includes liquid water.

31. A hydraulically bonded article as defined in claim 30, wherein the liquid water includes one or more dissolved solutes which modify the hydration of the hydraulic cement composition.

32. A hydraulically bonded article as defined in claim 18, wherein the hydraulic cement composition is hydrated in a controlled gaseous environment including carbon dioxide.

33. A hydraulically bonded article as defined in claim 18, wherein the hydraulic cement composition is hydrated in an environment having a temperature in a range from about −10° C. to about 200° C.

34. A hydraulically bonded article as defined in claim 18, wherein the hydraulic cement composition includes a plurality of fibers dispersed therein.

35. A hydraulically bonded article as defined in claim 18, wherein the hydraulic cement composition is hydrated by immersing the mechanically self-supporting structure in water.

36. An article prepared by the process comprising the steps of:
   a) placing a substantially unhydrated cement composition into a mold, the hydraulic cement composition including hydraulic cement particles, nonremovable aggregate particles, and removable aggregate particles, the hydraulic cement particles and nonremovable aggregate particles having a particle size distribution that maximizes the packing density of the hydraulic cement composition;
   b) forming the hydraulic cement composition under pressure into a substantially unhydrated, mechanically self-supporting structure corresponding substantially to a desired configuration of the article and such that air within said unhydrated hydraulic cement composition is substantially removed; and
   c) removing the mechanically self-supporting structure from the mold, the substantially unhydrated structure having sufficient mechanical strength such that it may be hydrated by immersion in water without significant mechanical disruption of the structure.

37. An article as defined in claim 36, wherein the hydraulic cement composition is hydrated by autoclaving.

38. An article as defined in claim 36 further including the step of hydrating the substantially unhydrated, mechanically self-supporting structure with water without substantial mechanical mixing of the hydraulic cement composition and the water in order to form a hydraulically bonded composite article.

39. An article as defined in claim 38, wherein the hydraulic cement composition is hydrated by immersing the mechanically self-supporting structure in water.

40. An article as defined in claim 38, wherein the hydraulic cement composition is hydrated by contacting the hydraulic cement composition with water vapor.

41. An article as defined in claim 38, wherein the hydraulic cement composition is hydrated by contacting the hydraulic cement composition with atomized water.

42. An article as defined in claim 38, wherein the hydraulic cement composition is hydrated by autoclaving the hydraulic cement composition under elevated pressure and temperature.

43. An article as defined in claim 36, further including the step of removing the removable aggregate from the hydraulic cement composition by causing the removable aggregate to undergo a phase change, the removal of the solid removable aggregate leaving a predetermined level of porosity within the hydraulically bonded article, thereby forming an article having a reduced density.

* * * * *

UNITED STATES PATENT AND TRADEMARK OFFICE
CERTIFICATE OF CORRECTION

PATENT NO. : 5,635,292  
DATED : June 3, 1997  
INVENTOR(S) : Hamlin M. Jennings, et al Page 1 of 2

It is certified that error appears in the above-identified patent and that said Letters Patent is hereby corrected as shown below:

Col. 2, line 21, "shaded" should be --shaped--

Col. 3, line 12, "water both" should be --water (both--

Col. 3, line 22, "are It also" should be --are also--

Col. 4, line 39, "trimodai" should be --trimodal--

Col. 4, line 47, "trimodai" should be --trimodal--

Col. 5, line 55, "parts but, can" should be --parts, but can--

Col. 8, line 48, "non" should be --not--

Col. 8, line 66, "be may" should be --may be--

Col. 9, line 25, in the table, dicalcium silicate labeled as "$2C_3S$" should be --$2C_2S$--

Col. 9, line 47, "dimension." should be --dimension.)--

Col. 11, line 10, "w heat" should be --heat--

Col. 12, line 59, "and 65%" should be --65%--

Col. 12, line 62, "62%" should be --and 62%--

Col. 14, line 43, "of the" should be --of the salts.--

UNITED STATES PATENT AND TRADEMARK OFFICE
CERTIFICATE OF CORRECTION

PATENT NO. : 5,635,292
DATED : June 3, 1997
INVENTOR(S) : Hamlin M. Jennings, et al It is certified that error appears in the above-identified patent and that said Letters Patent is hereby corrected as shown below:

Col. 15, line 33, "and 65%" should be --65%--

Col. 15, line 46, "62%" should be --and 62%--

Signed and Sealed this

Sixth Day of January, 1998

BRUCE LEHMAN

*Attest:*

*Attesting Officer*     *Commissioner of Patents and Trademarks*